United States Patent [19]
Sauvageau et al.

[11] Patent Number: 5,933,558
[45] Date of Patent: Aug. 3, 1999

[54] OPTOELECTRONIC DEVICE AND METHOD OF ASSEMBLY

[75] Inventors: Joseph E. Sauvageau; James H. Knapp, both of Chandler; Francis J. Carney, Gilbert; Laura J. Norton, Apache Junction, all of Ariz.

[73] Assignee: Motorola, Inc., Schaumburg, Ill.

[21] Appl. No.: 08/861,880

[22] Filed: May 22, 1997

[51] Int. Cl.⁶ .................................................. G02B 6/36
[52] U.S. Cl. ............................... 385/88; 385/89; 385/92
[58] Field of Search .................................. 385/88–94, 71, 385/49, 39, 50, 51, 52

[56] References Cited

U.S. PATENT DOCUMENTS

| | | | |
|---|---|---|---|
| 3,846,010 | 11/1974 | Love et al. ................................ | 350/96 |
| 4,357,072 | 11/1982 | Goodfellow et al. ..................... | 385/91 |
| 4,943,136 | 7/1990 | Popoff ..................................... | 350/96.16 |
| 5,093,879 | 3/1992 | Bregman et al. ......................... | 385/93 |
| 5,175,790 | 12/1992 | Groh et al. ............................... | 385/143 |
| 5,202,943 | 4/1993 | Carden et al. ............................ | 385/92 |
| 5,228,101 | 7/1993 | Lebby et al. ............................. | 385/91 |
| 5,230,030 | 7/1993 | Hartman et al. .......................... | 385/50 |
| 5,259,053 | 11/1993 | Schaffer et al. .......................... | 385/52 |
| 5,276,754 | 1/1994 | Blair et al. ............................... | 385/88 |
| 5,337,391 | 8/1994 | Lebby ...................................... | 385/88 |
| 5,345,527 | 9/1994 | Lebby et al. ............................. | 385/114 |
| 5,359,686 | 10/1994 | Galloway et al. ........................ | 385/49 |
| 5,389,312 | 2/1995 | Lebby et al. ............................. | 264/1.24 |
| 5,416,872 | 5/1995 | Sizer, II et al. .......................... | 385/92 |
| 5,420,954 | 5/1995 | Swirhun et al. .......................... | 385/92 |
| 5,432,630 | 7/1995 | Lebby et al. ............................. | 359/152 |
| 5,473,716 | 12/1995 | Lebby et al. ............................. | 385/54 |
| 5,548,677 | 8/1996 | Kakii et al. .............................. | 385/89 |
| 5,768,456 | 6/1998 | Knapp et al. ............................. | 385/49 |
| 5,781,682 | 7/1998 | Cohen et al. ............................. | 385/89 |

OTHER PUBLICATIONS

"Plastic–Based Receptacle–Type VCSEL–Array Modules with One and Two Dimensions Fabricated Using the Self–Alighnment Technique" Kosaka, Kajita, Yamada, Sugimoto, Kurata, Tanabe and Kasukawa, 1997 Proceedings 47th Electronic Components & Technology Conference May 18–21, 1997, San Jose, California, pp. 382–390.

*Primary Examiner*—Hemang Sanghavi
*Attorney, Agent, or Firm*—Rennie William Dover

[57] ABSTRACT

An optoelectronic connector (10) coupled to a fiber ferrule (38) containing an optical fiber (39) and a method for coupling the optoelectronic connector (10) to the fiber ferrule (38). The optoelectronic connector (10) has a base (11) and walls (13, 14, 17, and 18) that form a cavity (19). A semiconductor receiving area (26) extends into a first portion of the base (11) and an interconnect recess (27) extends into a second portion of the base (11). Alignment pins (31) extend from the second portion of the base (11). The optoelectronic connector (10) may be a unitary structure. The fiber ferrule (38) is inserted into the cavity (19) to form an optoelectronic device (30).

20 Claims, 4 Drawing Sheets

5,933,558

OPTOELECTRONIC DEVICE AND METHOD OF ASSEMBLY

BACKGROUND OF THE INVENTION

The present invention relates, in general, to semiconductor devices and, more particularly, to optoelectronic semiconductor devices.

Optical communications systems are comprised of light emission devices coupled to light detection devices via a plurality of optical fibers. The optical fibers are typically arranged as a bundle of fibers having a light receiving end and a light emitting end. The light receiving and emitting ends are housed in fiber ferrules. The fiber ferrule at the light receiving end of the bundle is coupled to the light emitting device via an optical interface unit. Likewise, the fiber ferrule at the light emitting end of the bundle is coupled to the light detecting device via an optical interface unit. Thus, an optical or light signal from the light emitting device is transmitted to the light detecting device through two optical interface units, two fiber ferrules, and the bundle of optical fibers.

A drawback of these systems is the large number of optical interface or coupling points through which the optical signals pass. In currently available systems, optical signals pass through at least four interfaces, i.e., interfaces between the optical interface units and the light emission and detection devices and interfaces between the optical interface units and the fiber ferrules. Each time the optical signal passes through an optical interface, a portion of the signal is lost, thereby degrading the quality of the signal received by the light detection device.

Accordingly, it would be advantageous to have a method and device for coupling or interconnecting an optical fiber to light emission and detection devices that reduces the signal loss along an optoelectronic path. It would be of further advantage for the method and device to be cost efficient and easily manufacturable.

DETAILED DESCRIPTION OF THE DRAWINGS

Figure 1:
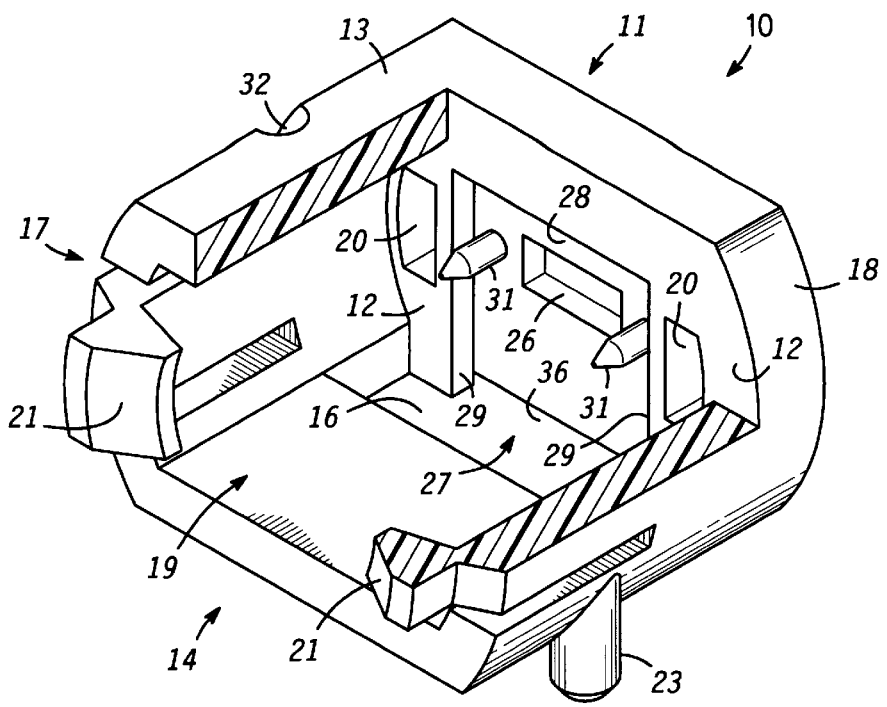
FIG. 1 is a partially cut-away isometric view of an optoelectronic connector in accordance with a first embodiment of the present invention.

Generally, the present invention provides an optoelectronic device and a method for assembling the optoelectronic device. In one aspect of the present invention, an optoelectronic connector is provided. In another aspect of the present invention, the optoelectronic connector and a fiber ferrule cooperate to form the optoelectronic device. In yet another aspect of the present invention, an interconnect structure is mounted to or formed on the optoelectronic connector. Examples of the interconnect structure include a tape automated bonding (TAB) tape, flip-chip molded contacts, wire-bonded molded contacts, and the like.

Although the terms "optical" and "light" are used herein, it should be understood that these terms include all wavelengths between and including infrared and ultraviolet. It should be further understood that the same reference numerals are used in the figures to denote the same elements.

FIG. 1 is a partially cut-away isometric view of an optoelectronic connector 10 in accordance with a tape automated bonding (TAB) embodiment of the present invention. Optoelectronic connector 10 includes a base or backwall 11 having a surface 12 and a plurality of walls 13, 14, 17, and 18 extending from base 11. Walls 13, 14, 17, and 18 cooperate to form a cavity or ferrule receiving region 19. Thus, walls 13 and 14 are opposite each other and walls 17 and 18 are opposite each other. Wall 14 has an opening 16 through which an interconnect structure (not shown) extends. Walls 17 and 18 have clips 21 for securing optoelectronic connector 10 to the ferrule. In addition, a locator pin 23 extends from wall 18 in a direction facing way from ferrule receiving cavity 19. Preferably, another locator pin (not shown) extends from wall 14 at the intersection of wall 14 and wall 17. Locator pins 23 mate with locator holes on a substrate (not shown) such as, for example, a printed circuit board, to position optoelectronic connector 10 on the printed circuit board. Because locator pins 23 serve to position optoelectronic connector 10 on, for example, a printed circuit board, they are also referred to as positioning features. It should be understood that locator pins 23 are optional features that are useful for positioning optoelectronic connector 10 on a substrate.

A semiconductor receiving area 26 extends from surface 12 into base 11. The distance semiconductor receiving area 26 extends into base 11 is not a limitation of the present invention. In one example, semiconductor receiving area 26 extends partially into base 11. In another example, semiconductor receiving area 26 is an opening extending completely through base 11. Preferably, semiconductor receiving area 26 is a recess shaped to accept a semiconductor component. In addition, an interconnect recess 27 extends from surface 12 into base 11, wherein interconnect recess 27 surrounds semiconductor receiving area 26. By way of example, interconnect recess 27 is a cavity having a floor 28 and walls 29. Interconnect recess 27 is also referred to as an interconnect cavity. Preferably, semiconductor receiving area 26 extends further into base 11 than does interconnect recess 27.

Alignment pins 31 protrude from floor 28 of interconnect recess 27 and extend above the plane of surface 12. Alignment pins 31 are alignment features that are used to align an optical fiber to a semiconductor component (shown in FIG. 5). A notch 36 formed in base 11 is adapted to receive a TAB tape (shown in FIG. 3).

Preferably, optoelectronic interconnect 10 is a unitary structure that is formed using an injection molding process. By way of example, optoelectronic interconnect 10 is formed from a molded plastic or other low cost material. The type of material from which optoelectronic interconnect 10 is formed is not a limitation of the present invention. In addition, alignment pins 31 may be formed from the molded plastic material of base 11 or they can be pins that are molded into base 11. When alignment pins 31 are molded into base 11, they may be made from metal, ceramic, or the like.

FIG. 1 further illustrates openings 20 extending through base 11. Openings 20 are optional features that simplify the structure and function of the mold used to form optoelectronic connector 10. In addition, optoelectronic connector 10 optionally includes pick and place notches 32 that are used in cooperation with pick and place equipment to position optoelectronic connector 10 on a circuit board.

Figure 2:
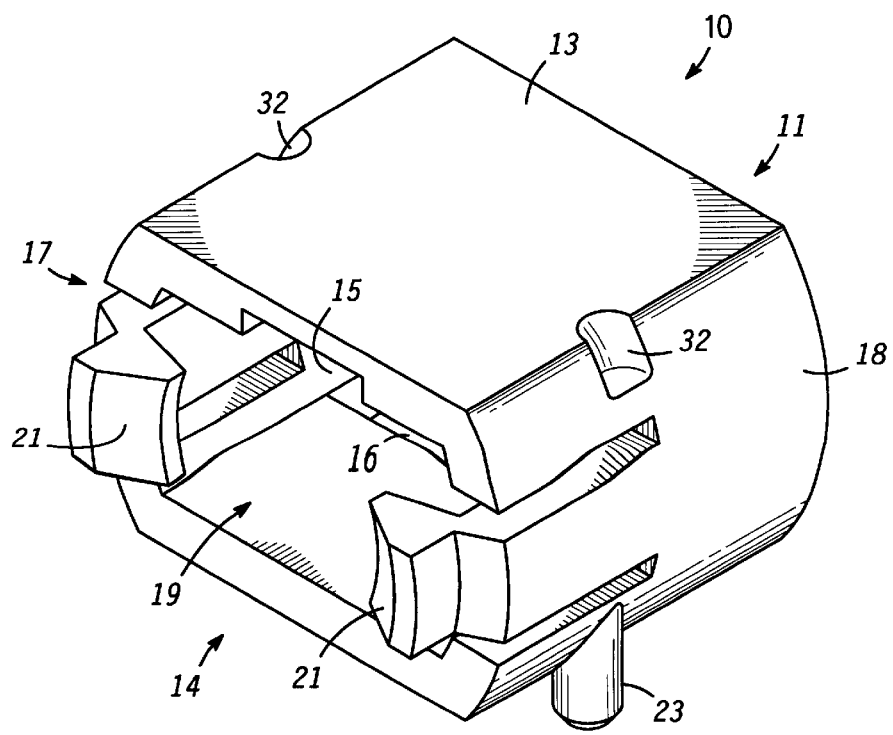
FIG. 2 is an isometric view of the optoelectronic connector of FIG. 1.

FIG. 2 is an isometric view of optoelectronic connector 10. The isometric view of FIG. 2 further illustrates base 11, walls 13, 14, 17, and 18, cavity 19, opening 16, clips 21, locator pins 23, and pick and place notches 32. FIG. 2 also shows a notch 15 that serves as a coarse alignment feature for a ferrule (shown in FIG. 5).

Figure 3:
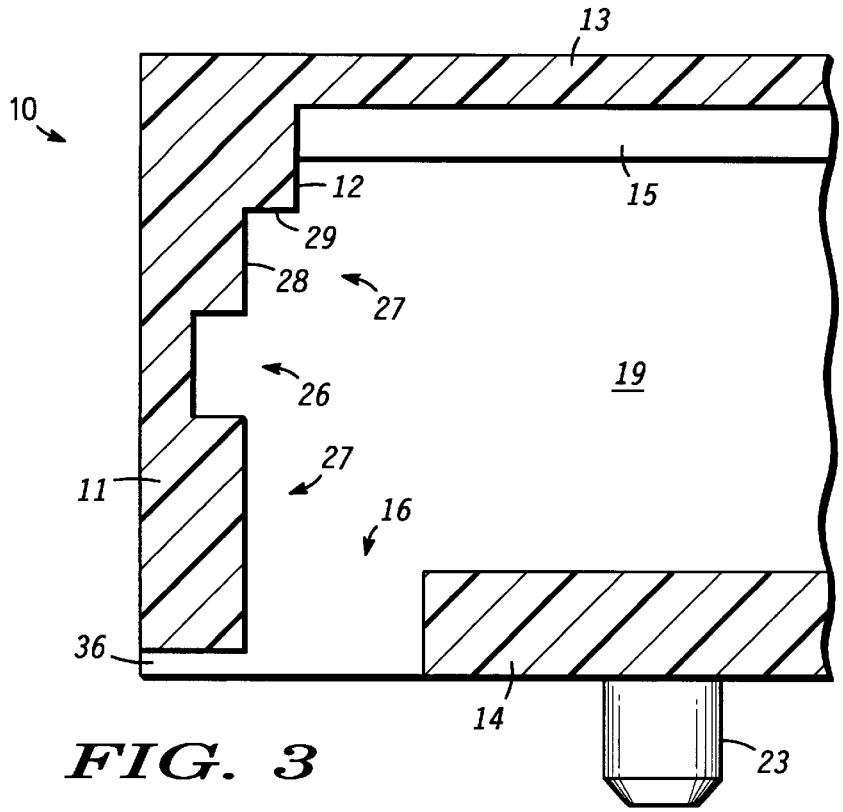
FIG. 3 is a cross-sectional view of the optoelectronic connector of FIG. 2.

FIG. 3 is a cross-sectional view of optoelectronic connector 10 in accordance with a TAB embodiment of the present invention. What is shown in FIG. 3 is base 11 having surface 12, semiconductor receiving area 26, and interconnect recess 27 extending into base 11 from surface 12. Interconnect recess 27 has a floor 28 and walls 29. Walls 13 and 14 extend from base 11 and, in conjunction with walls 17 and 18, form cavity 19. In addition, FIG. 3 illustrates cavity 16, locator pin 23, and notches 15 and 36.

Figure 4:
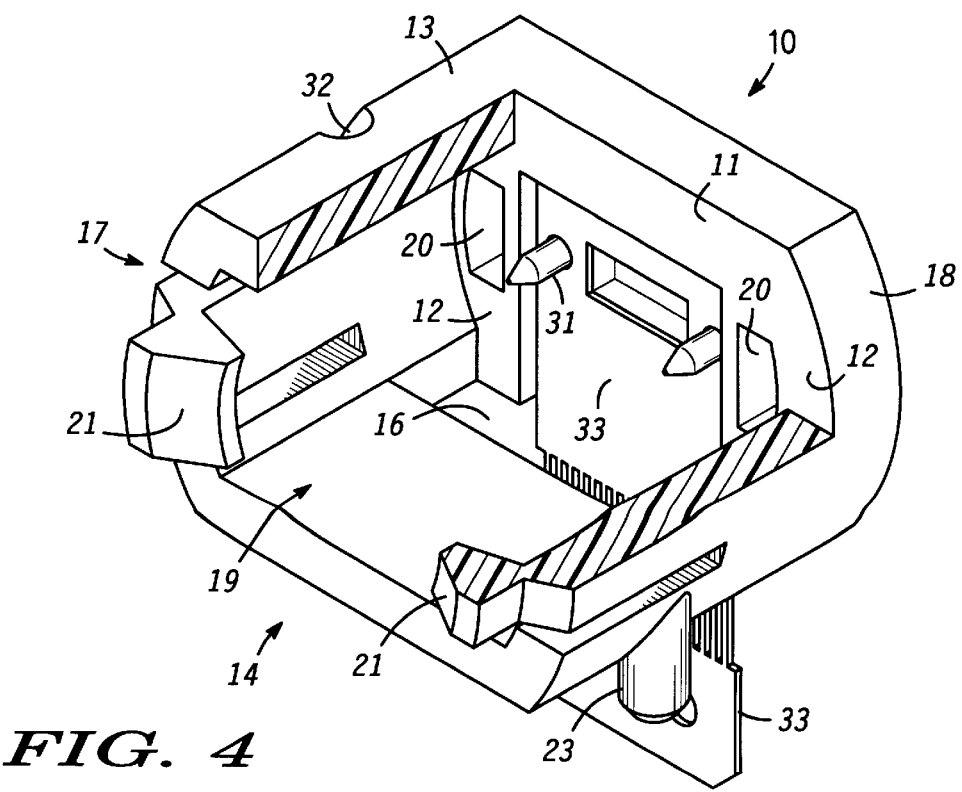
FIG. 4 is a partially cut-away isometric view of the optoelectronic connector of FIG. 1 having a tape automated bonding (TAB) tape mounted thereon.

FIG. 4 is yet another partially cut-away perspective view of optoelectronic connector 10. What is shown in FIG. 4 is base 11, surface 12, walls 13, 14, 17, 18, opening 16, cavity 19, clips 21, openings 20, locator pins 23, and alignment pins 31. In a TAB tape embodiment, a TAB tape 33 is positioned on floor 28 of interconnect recess 27 and formed or bent for interconnection with a printed circuit board (not shown). Forming or bending TAB tape 33 allows mounting optoelectronic connector 10 snugly to the printed circuit board. It should be noted that TAB tape 33 may be removably mounted to base 11 as well as bonded to base 11.

Figure 5:
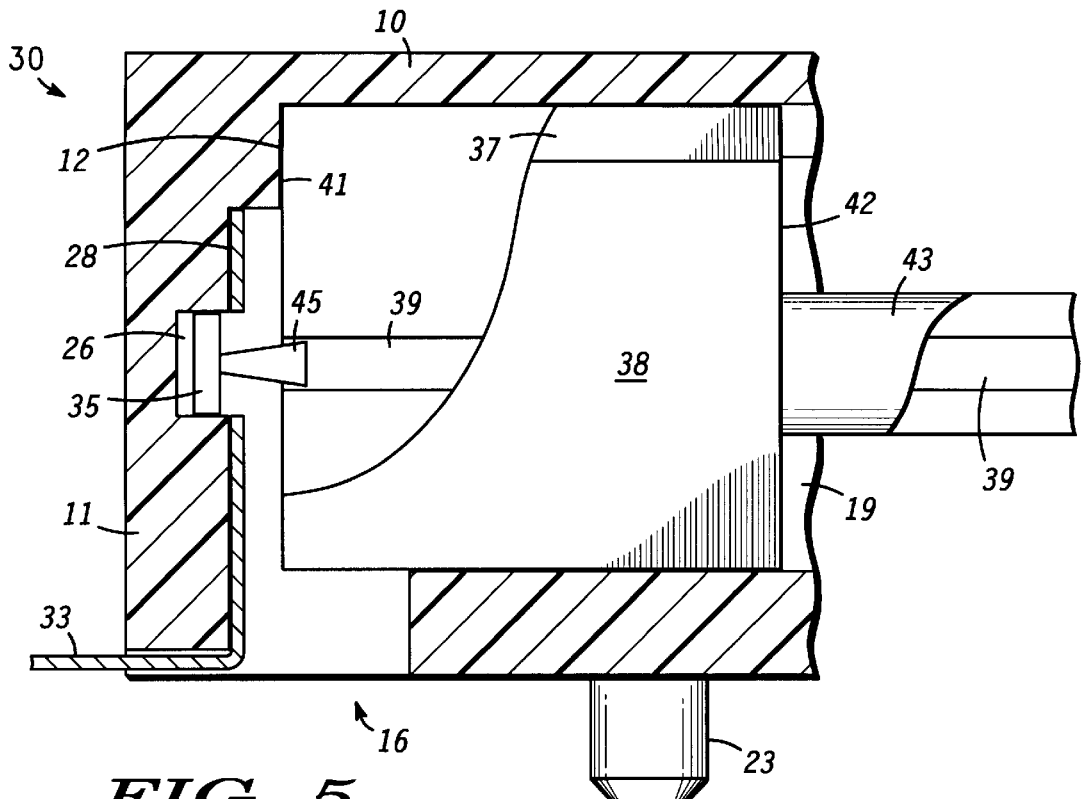
FIG. 5 is a cross-sectional view of an optoelectronic device in accordance with a TAB embodiment of the present invention.

Now referring to FIG. 5, a fiber ferrule or pre-aligner 38 having an optical fiber 39 extending therethrough is illustrated as being mated with optical connector 10, thereby forming an optoelectronic device 30. Fiber ferrule 38 has a mating surface 41 that contacts surface 12 when fiber ferrule 38 is positioned in cavity 19. Fiber ferrule 38 also has a rear surface 42 through which optical fiber 39 extends. The portion of optical fiber 39 extending from rear surface 42 is typically encapsulated by a protective sheath 43 which is often referred to as a pigtail. In addition, fiber ferrule 38 has an alignment guide 37 that mates with notch 15 to provide coarse alignment of optical fiber 39 with photonic device 35. Photonic device 35 may be a light emitting diode, a photodetector, a laser diode, or the like. By way of example, alignment guide 37 is a rail extending from fiber ferrule 38. In other words, alignment guide 37 cooperates with notch 15 to align optical fiber 39 with photonic device 35. Although not shown, it should be noted that fiber ferrule 38 includes a coupling cavity into which alignment pins 31 extend.

Optoelectronic interconnect 10 allows "butt-coupling" of fiber ferrule 38 with base 11, which in turn minimizes the distance between photonic device 35 and optical fiber 39 and maximizes the coupling efficiency of light transmitted between the photonic device and the optical fiber. For example, the coupling efficiency is nearly 100% when the fiber is a graded index fiber having a diameter of 62.5 micrometers ($\mu$m), the light source is a diverging source having a half angle of 12 degrees, and the distance between photonic device 35 and optical fiber 39 is approximately 75 $\mu$m (approximately 3 mils). The optical or light signal from photonic device 35 is identified by reference number 45 in FIG. 5. Thus, FIG. 5 further illustrates that nearly all of the optical or light signal from photonic device 35 is transmitted to optical fiber 39. As those skilled in the art are aware, the coupling efficiency will vary in accordance with the type of optical fiber, the distance between the photonic device and the optical fiber, and the type of photonic device.

An advantage of an optoelectronic device in accordance with the TAB embodiment is that the end of optical fiber 39 may be coplanar with coupling surface 41. Moreover, mounting optoelectronic device 35 to base 11 using a TAB tape minimizes the distance between the light emitting portion of optoelectronic device 35 and optical fiber 39. For example, an end of optical fiber 39 may be positioned to be less than 125 micrometers from photonic device 35.

Although fiber ferrule 38 is shown as having a single optical fiber 39 extending therethrough, it should be understood this is not a limitation of the present invention. In other words, there may be a plurality of optical fibers 39 extending through fiber ferrule 38. Further, there may be a plurality of photonic devices 35 mounted to optoelectronic connector 10, wherein each optical fiber of the plurality of optical fibers is aligned with a corresponding photonic device 35 of the plurality of photonic devices. As thosed skilled in the art are aware, there are typically a plurality of photonic devices fabricated in a single semiconductor die. Thus, the plurality of optical fibers 39 are typically aligned to a single die, wherein each optical fiber of the plurality of optical fibers 39 is aligned to a single photonic device 35 of the plurality of photonic devices.

Figure 6:
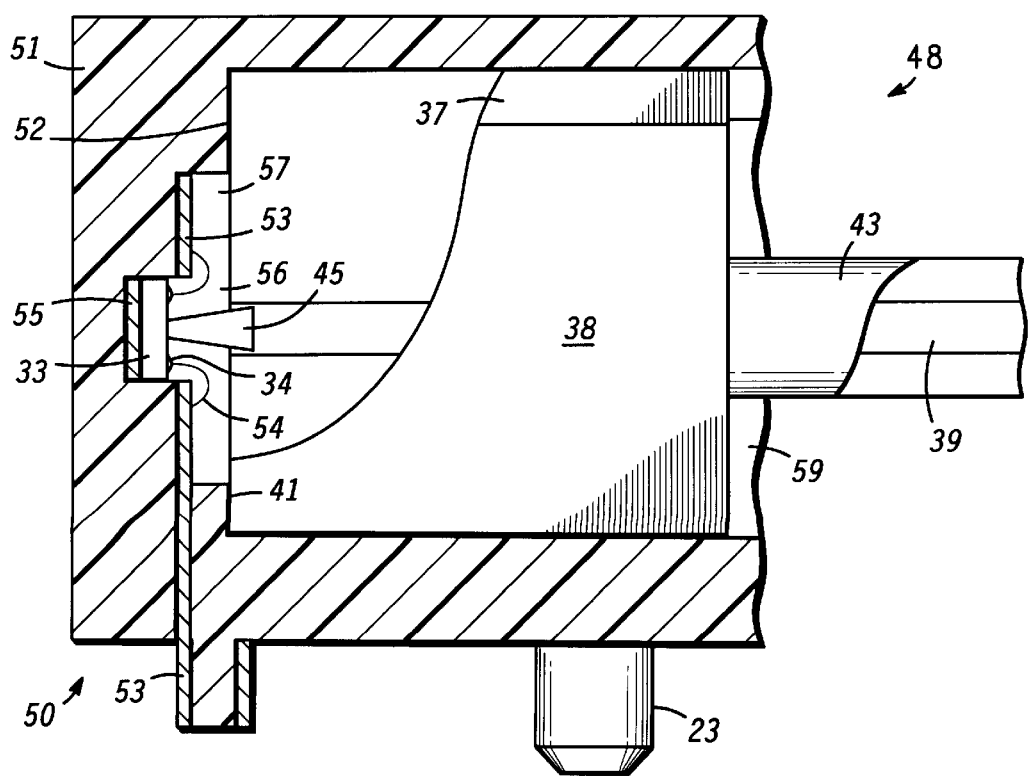
FIG. 6 is a cross-sectional view of an optoelectronic device in accordance with a molded contact embodiment of the present invention.

FIG. 6 is a cross-sectional view of an optoelectronic device 48 in accordance with a molded contact embodiment of the present invention. What is shown in FIG. 6 is an optoelectronic interconnect 50 that includes a base 51 having a surface 52, a semiconductor receiving area 56, and an interconnect recess 57. Semiconductor receiving area 56 and interconnect recess 57 extend into base 51 from surface 52. Contacts 53 and a chip pad 55 are molded into base 51 using techniques well known to those skilled in the art. Preferably, optoelectronic interconnect 50 is a unitary structure. A photonic device 35 having bonding pads 34 is mounted on chip pad 55 in semiconductor receiving area 56. Preferably, photonic device 35 is bonded to chip pad 55 using techniques well known to those skilled in the art. Bonding pads 34 are coupled to corresponding electrical contacts 53 using wirebonds 54. Wirebonds 54 are manufactured such that they do not extend above surface 52, i.e, they do not "break" the plane of surface 52.

FIG. 6 further illustrates fiber ferrule 38 having an optical fiber 39 extending therethrough. Mating surface 41 of fiber ferrule 38 contacts surface 52 when fiber ferrul 38 is positioned in cavity 59. Fiber ferrule 38 has been described with reference to FIG. 3. Like optoelectronic interconnect 10, optoelectronic interconnect 50 allows "butt-coupling" of fiber ferrule 38 with base 51, which in turn minimizes the distance between photonic device 35 and optical fiber 39.

Figure 7:
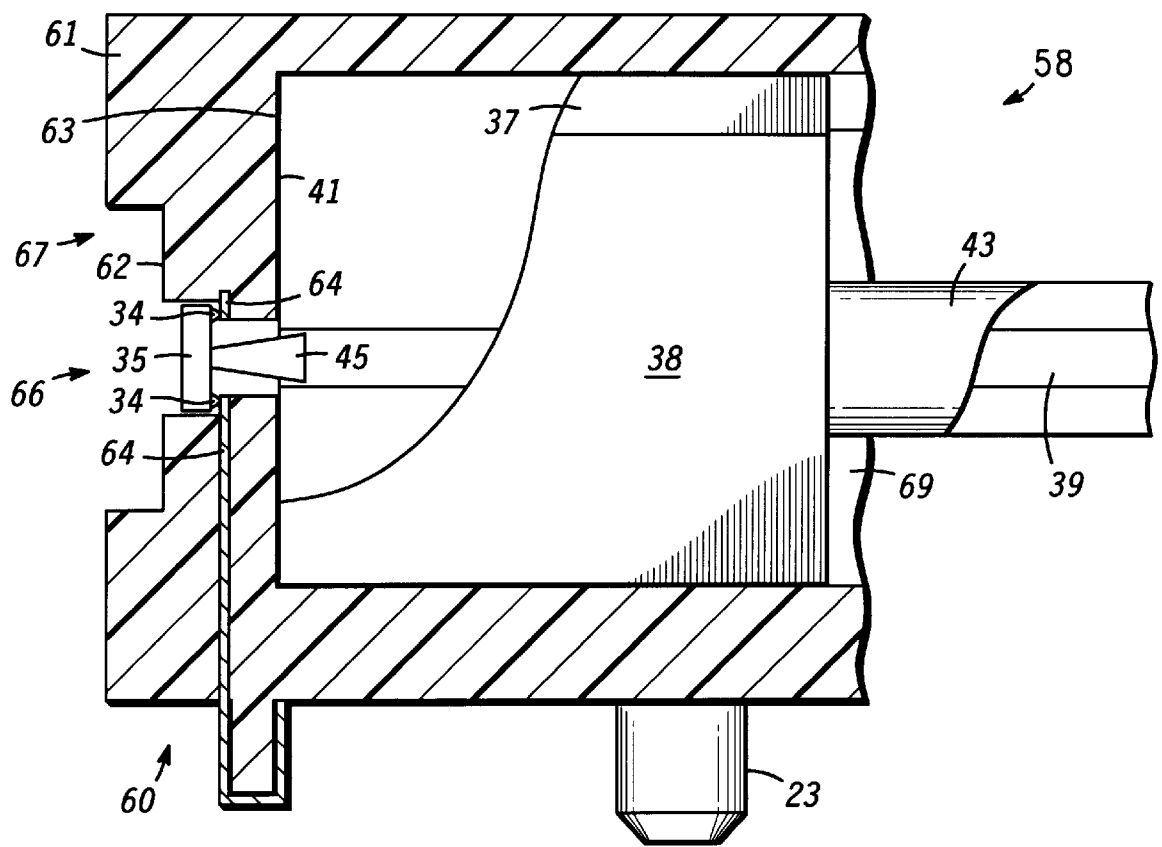
FIG. 7 is a cross-sectional view of an optoelectronic device in accordance with a flip-chip molded contact embodiment of the present invention.

FIG. 7 is a cross-sectional view of an optoelectronic device 58 in accordance with a flip-chip molded contact embodiment of the present invention. What is shown in FIG. 7 is an optoelectronic interconnect 60 that includes a base 61 having opposing surfaces 62 and 63, a semiconductor receiving area 66, and an interconnect recess 67. Semiconductor receiving area 66 and interconnect recess 67 extend into base 61 from surface 62. Contacts 64 are molded into base 61 using techniques well known to those skilled in the art. Preferably, optoelectronic interconnect 60 is a unitary structure. A photonic device 35 having bonding pads 34 is flip-chip bonded to electrical contacts 64 in semiconductor receiving area 56 using techniques well known to those skilled in the art.

Still referring to FIG. 7, fiber ferrule 38 having an optical fiber 39 extending therethrough is also illustrated. Mating surface 41 of fiber ferrule 38 contacts surface 63 when fiber ferrule 38 is positioned in cavity 69. Fiber ferrule 38 has been described with reference to FIG. 3. Like optoelectronic interconnect 10, optoelectronic interconnect 60 allows "butt-coupling" of fiber ferrule 38 with base 61, which in turn minimizes the distance between photonic device 35 and optical fiber 39.

By now it should be appreciated that an optoelectronic device and a method for optically coupling an optoelectronic fiber to an optoelectronic component have been provided. In accordance with the present invention, a fiber connector is directly mated or butt-coupled with a base or support structure rather than coupling the fiber connector to the support structure via an optical interface unit. Thus, optoelectronic devices of the present invention do not include optical interface units. Elimination of optical interface units lowers the cost of the optoelectronic device and increases the strength of the optical signal received by an optical detector, i.e., increases the coupling efficiency when transmitting an optical signal from an optical transmitter to an optical receiver. In addition, the optical interconnects of the present invention permit passive alignment between photonic devices and optical fibers.

We claim:

1. An optoelectronic device, comprising:
   a base having a support wall, the support wall having a first surface;
   first and second walls extending from the support wall, the first and second walls opposite one another;
   a third wall extending from the support wall, the third wall in contact with the first and second walls;
   a fourth wall spaced apart from the support wall and in contact with the first and second walls such that an opening is between the fourth wall and the support wall, and wherein the support, first, second, third, and fourth walls cooperate to form a cavity;
   a recess in the support wall, the recess having a second surface;
   a semiconductor component receiving area extending from the second surface into the support wall;
   a first alignment feature extending from the base; and
   a semiconductor component located in the semiconductor component receiving area.

2. The optoelectronic device of claim 1, further including a ferrule having a mating surface and an optical fiber extending therethrough.

3. The optoelectronic device of claim 2, wherein the semiconductor component is a photonic device.

4. The optoelectronic device of claim 1, further including an interconnect cavity extending from the second surface into the support wall, wherein the interconnect cavity is adjacent the semiconductor component receiving area.

5. The optoelectronic device of claim 4, further including a tape automated bonding (TAB) tape located in the interconnect cavity, wherein the semiconductor component is bonded to the TAB tape.

6. The optoelectronic device of claim 4, further including electrical contacts in the base, wherein the semiconductor component is flip-chip bonded to the electrical contacts.

7. The optoelectronic device of claim 4, further including electrical contacts in the base, wherein the semiconductor component is wire bonded to the electrical contacts.

8. An optoelectronic connector, comprising:
   a base having a first surface, wherein a recess extends from the first surface into the base, the recess having recess walls, a floor, and a semiconductor component receiving area extending from the floor into the base;
   a first wall extending from a first portion of the first surface and terminating with a first clip;
   a second wall extending from a second portion of the first surface and terminating with a second clip, the first and second walls facing one another;
   a third wall extending from a third portion of the first surface, the third wall coupling the first wall to the second wall;
   a fourth wall spaced apart from the first surface and coupling the first wall to the second wall, the third and fourth walls substantially parallel to each other, wherein the first, second, third, and fourth walls cooperate to form a cavity; and
   a first alignment feature extending from the floor.

9. The optoelectronic connector of claim 8, wherein the optoelectronic connector is a unitary structure.

10. The optoelectronic connector of claim 9, wherein the optoelectronic connector is plastic.

11. The optoelectronic connector of claim 8, further including
    a second alignment feature extending into the third wall.

12. The optoelectronic connector of claim 11, further including
    a positioning feature protruding from one of the third and fourth walls, wherein the positioning feature protrudes in a direction facing away from the cavity.

13. The optoelectronic connector of claim 8, further including an interconnect recess extending from the surface into the base, wherein the interconnect recess is adjacent the recess walls.

14. The optoelectronic connector of claim 13, further including a tape automated bonding (TAB) tape located in the interconnect recess.

15. The optoelectronic connector of claim 13, further including electrical contacts located in the interconnect recess.

16. The optoelectronic connector of claim 8, wherein the first alignment feature includes a plurality of alignment pins molded into the base.

17. A method for assembling an optoelectronic device, comprising the steps of:
    mounting an optoelectronic component to an optoelectronic connector comprising:
    a base having a first surface, wherein a recess extends from the first surface into the base, the recess having recess walls, a floor, and a semiconductor component receiving area extending from the floor into the base;
    a first wall extending from a first portion of the first surface and terminating with a first clip;
    a second wall extending from a second portion of the first surface and terminating with a second clip, the first and second walls facing one another;
    a third wall extending from a third portion of the first surface, the third wall coupling the first wall to the second wall;

a fourth wall spaced apart from the first surface and coupling the first wall to the second wall, the third and fourth walls substantially parallel to each other, wherein the first, second, third, and fourth walls cooperate to form a cavity; and an alignment feature extending from the floor;

coupling an optical fiber to a fiber connector; and directly coupling the fiber connector to the optoelectronic connector, wherein an end of the optical fiber is spaced apart from the optoelectronic component.

18. The method of claim 17, wherein the step of mounting an optoelectronic component to an optoelectronic connector includes mounting the optoelectronic component to a tape automated bonded (TAB) tape and mounting the TAB tape to the fiber connector.

19. The method of claim 17, wherein the step of directly coupling the fiber connector to the optoelectronic connector includes positioning an end of the optical fiber to be less than approximately 125 micrometers from the optoelectronic component.

20. The method of claim 17, further including the step of forming a molded contact in the optoelectronic connector and wherein the step of directly coupling the fiber connector to the optoelectronic connector includes mounting the optoelectronic component on the molded contact.

* * * * *